United States Patent
Crane

(10) Patent No.: US 7,147,446 B2
(45) Date of Patent: Dec. 12, 2006

(54) CROSSLINKING AGENT APPLICATION METHOD AND SYSTEM

(75) Inventor: Ray Crane, Columbus, MS (US)

(73) Assignee: Weyerhaeuser Company, Federal Way, WA (US)

( * ) Notice: Subject to any disclaimer, the term of this patent is extended or adjusted under 35 U.S.C. 154(b) by 376 days.

(21) Appl. No.: 10/336,390

(22) Filed: Jan. 2, 2003

(65) Prior Publication Data

US 2004/0130069 A1    Jul. 8, 2004

(51) Int. Cl.
*B29C 43/28* (2006.01)

(52) U.S. Cl. .................... 425/83.1; 425/92; 425/102; 425/363

(58) Field of Classification Search ............ 425/80.1, 425/83.1, 90–92, 102–103, 355, 363–367
See application file for complete search history.

(56) References Cited

U.S. PATENT DOCUMENTS

| | | | |
|---|---|---|---|
| 3,273,199 A | * | 9/1966 | Kleinewefers .............. 425/335 |
| 3,742,585 A | | 7/1973 | Wentzell |
| 4,028,457 A | * | 6/1977 | Davey ......................... 264/120 |
| 4,600,599 A | | 7/1986 | Wallsten |
| 4,728,541 A | * | 3/1988 | Voswinckel ................ 427/387 |
| 5,128,082 A | * | 7/1992 | Makoui ....................... 264/112 |
| 5,405,650 A | | 4/1995 | Boulanger et al. |
| 5,567,473 A | | 10/1996 | Lacz et al. |
| 5,641,561 A | | 6/1997 | Hansen et al. |
| 5,783,045 A | * | 7/1998 | Santos et al. ............... 162/301 |

FOREIGN PATENT DOCUMENTS

| | | |
|---|---|---|
| EP | 0 427 316 A2 | 5/1991 |
| EP | 0 427 317 A2 | 5/1991 |
| EP | 0 429 112 A2 | 5/1991 |
| EP | 0 440 472 A1 | 8/1991 |

\* cited by examiner

*Primary Examiner*—Duane Smith
*Assistant Examiner*—Thu Khanh T. Nguyen

(57) ABSTRACT

Methods and systems for applying crosslinking agent to a sheet of cellulose fibers are described. The method and system apply crosslinking agent to one or both sides of the sheet and results in a sheet having a high loading of crosslinking agent that is uniformly distributed within the sheet.

6 Claims, 4 Drawing Sheets

CROSSLINKING AGENT APPLICATION METHOD AND SYSTEM

FIELD OF THE INVENTION

The present invention relates to methods and systems for applying crosslinking agent to a sheet of cellulose fibers.

BACKGROUND OF THE INVENTION

It is known that resilient bulking fibers are useful in the preparation of bulkier and more absorbent fiber structures. Such fiber structures may be useful in the manufacture of products such as hand sheets, towels, tissues, filters, paper board, diapers, sanitary napkins, hospital dressings and the like. One method of obtaining resilient bulking fibers is by crosslinking cellulose fibers by a treatment with a crosslinking agent. Such high bulk fibers typically have primarily intra-fiber crosslink bonds within a fiber. That is, the crosslink bonds are primarily between cellulose molecules within a single fiber, rather than between cellulose molecules of separate fibers. One of the characteristics of such fibers is their bulk which can be measured by the Fiber Absorption Quality Analyzer (Weyerhaeuser Co., Federal Way, Washington) (FAQ). This test is described in U.S. Pat. No. 6,184,271 and is incorporated herein by reference. In certain applications, it is desired to maximize the bulk of the fibers.

Through their prior work, the present inventors observed that FAQ values can be impacted by the amount of crosslinking agent and the solution strength added to a mat of cellulose fibers to be crosslinked. The amount of crosslinking agent and the solution strength added to a mat of cellulose fibers to be crosslinked cannot be so large that the consistency of the fiber sheet exceeds certain limits. Given such limits, in order to add as much crosslinking agent to the fiber sheet as possible, the crosslinking agent should be distributed completely and uniformly throughout the sheet.

Sheets of cellulose fibers to which crosslinking agent can be applied are provided by a wet laid sheet manufacturing line such as a pulp sheet manufacturing line. In such a process, a pulp slurry is delivered from a head box through a slice onto a Fourdrinier wire. The pulp slurry includes cellulose fibers such as wood pulp fibers and may also include synthetic or other noncellulose fibers. Water is drawn from the pulp slurry deposited on the Fourdrinier wire by a vacuum system, leaving a deposited pulp sheet which is carried through press sections to further remove the water from the fiber sheet. From the press sections, the pulp sheet enters a drying section further remove latent water. The pulp sheet follows a serpentine path through the dryer sections and exits as a dried sheet of cellulose fibers. The dried pulp sheet generally has a maximum moisture content which is no more than about 15% by weight of the fibers. If more than 15% by weight moisture is present in the sheet of cellulose fibers, the fibers tend to be too damp and are thus more susceptible to degradation by mold or the like during storage. The dried sheet can be taken up on a roll or delivered to other unit operations for further processing, such as crosslinking.

Referring to FIG. 1, high bulk fibers can be produced by a method that can be summarized as follows. Sheets of uncrosslinked cellulose fibers from rolls 124 are treated with a chemical crosslinking agent at location 118. The treated sheets are then delivered to a hammermill 208 where the individual cellulose fibers are separated into substantially unbroken individualized cellulose fibers treated with the crosslinking agent. The substantially individualized fibers exit hammermill 208 at exit 230 and are delivered via conduits 232 and 236 to cyclone 226. Cyclone 226 separates the fibers from the air carrying the fibers. The fibers drop from outlet 242 of cyclone 226 and are fed to dryer 246 for flash evaporation of residual moisture. Curing of the crosslinking material occurs subsequent to the drying of the fibers. The resulting crosslinked cellulose fibers can then be collected and packaged. U.S. Pat. No. 5,641,561 is referenced for additional detail regarding an exemplary crosslinking process.

In one process for applying a crosslinking agent to a sheet of cellulose fibers, a sheet of fibers in a vertical orientation is passed through a reservoir of the crosslinking material. From the reservoir, the sheet including the cellulose fibers and crosslinking agent is delivered to a press which applies a load to the wet sheet. The press serves not only to transport the sheet but also to encourage the crosslinking agent to distribute itself throughout the mat of cellulose fibers. While effective at introducing some crosslinking agent into the sheet of cellulose fibers, this process has been observed to result in incomplete distribution and/or uneven distribution of crosslinking agent in the sheet of cellulose fibers. Accordingly, the amount of crosslinking applied to the sheet is less than optimal. In addition, delamination of the mat of fibers was observed when the mat exited the press due to air being entrained in the treated sheet from the wall of crosslinking agent on both sides of the sheet. The amount of crosslinking agent impregnated into the sheet is also impacted by the speed of the sheet as it moves through the crosslinking agent reservoir.

In view of the recognition that the bulk, as measured by the FAQ test, is optimized when the crosslinking agent is fully and evenly distributed within a sheet of cellulose fibers from which the high bulk fibers are produced, a need exists for methods and systems to achieve more complete and uniform distribution levels of crosslinking agents than those achieved by prior impregnation techniques.

Furthermore, in view of the high cost associated with the installation of a physical facility to manufacture high bulk fibers, such method and systems would desirably be compatible with existing high bulk fiber production methods and hardware.

SUMMARY OF THE INVENTION

The present invention provides methods and systems for applying a crosslinking agent to a sheet of cellulose fibers. The methods and systems are able to achieve high loading levels and even distribution of crosslinking agent within a sheet of cellulose fibers in a manner that is compatible with existing processes and hardware for producing high bulk fibers. In addition, the methods and systems of the present invention achieve such distribution without delamination of the sheet of cellulose fibers.

In one aspect, the present invention is a method of applying crosslinking agent to a moving sheet of cellulose fibers. The method includes the step of passing the sheet of cellulose fibers having a first and a second opposing side past a fluid dispenser. An exemplary fluid dispenser includes a curtain header or curtain shower. Crosslinking agent is dispensed from the fluid dispenser onto the first side of the sheet of cellulose fibers. In a particular embodiment, subsequent to the application of the crosslinking agent to the first side of the sheet of cellulose fibers, downstream of the dispensing step, the second side of the sheet of cellulose fibers is contacted with crosslinking agent. A preferred way of contacting the second side of the sheet of cellulose fibers with crosslinking agent is to employ a second fluid dispenser that delivers crosslinking agents to the nip formed between a roll of a press and the second side of the sheet of cellulose fibers. Additional headers may be used to add varying types of crosslinking agent to the sheet and/or for further application of these agents as needed.

In a particular embodiment of the method, the press is a horizontal offset press that includes two rolls, each having an axis of rotation, the axis of rotation of one roll being offset vertically and horizontally from the axis of rotation of the other roll.

In another embodiment, the press is a vertical press comprising two rolls, the axes of rotation of which lie in the same horizontal plane.

In another aspect of the present invention, a system is provided for applying crosslinking agent to a moving sheet of cellulose fibers. The system includes a first fluid dispenser positioned to apply crosslinking agent onto a first side of the sheet of cellulose fibers. The system also includes a second fluid dispenser for applying crosslinking agent to a second opposing side of the sheet of cellulose fibers, the second fluid dispenser being positioned downstream in the direction of movement of the sheet of cellulose fibers from the first dispenser and upstream from a press. To complete the system, a press for receiving the sheet of cellulose treated with crosslinking agent is provided. In one embodiment, the press is a horizontal press having two rolls wherein the axis of rotation of the respective rolls is offset horizontally and vertically from each other. The purpose of the press rolls being offset is to develop a pond of crosslinking agent to assure that all surface areas of the sheet have been fully contacted by the crosslinking agent. In another embodiment, the press is a vertical press.

The present invention provides methods and systems for achieving high loading and uniform distribution of crosslinking agents in a sheet of cellulose fibers. The loading of the press can be adjusted from about 26 pli to 400 pli. Accordingly, individualized crosslinked fibers manufactured from such sheets impregnated with crosslinking agent in accordance with the present invention exhibit desirable bulk.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

While a particular embodiment of the present invention is illustrated and described herein, it will be appreciated that various changes can be made thereto without departing from the spirit and scope of the invention.

For example, the methods and systems of the present invention are described below in the context of a particular embodiment of a fluid dispenser. In addition, the methods and systems of the present invention are described in the context of a particular embodiments of a press. It should be understood that other fluid dispensers and other types of devices for applying pressure to both sides of a pulp sheet are useful in the context of the present invention. For example, sprayers, other header designs, rollers, etc. are examples of additional fluid dispensers.

The crosslinking agent is a liquid solution of any of a variety of crosslinking agents known in the art. If required, the crosslinking substance includes a catalyst to accelerate the bonding reactions between molecules of the crosslinking agent and the cellulose molecules. Exemplary types of crosslinking agents include those selected from a group consisting of urea derivatives such as methylolated urea, methylated urea, and polycarboxylic acids. Such crosslinkers are known in the art.

The method and system of the present invention achieve uniform distribution of crosslinking agent within a sheet of cellulose fibers to be crosslinked by applying crosslinking agent to one side of the sheet of cellulose fibers at a location upstream to the location where crosslinking agent is preferably applied to the second opposing side of the sheet of cellulose fibers. Without being bound by theory, it is believed that by applying the crosslinking agents to the respective sides of the sheets of the cellulose fibers in such a sequential manner, that air, or other gases, within the sheet of cellulose fibers does not inhibit the uniform and complete distribution of the crosslinking agent within the sheet. Particular embodiments for applying the crosslinking agent as noted above are described below in more detail.

Figure 3:
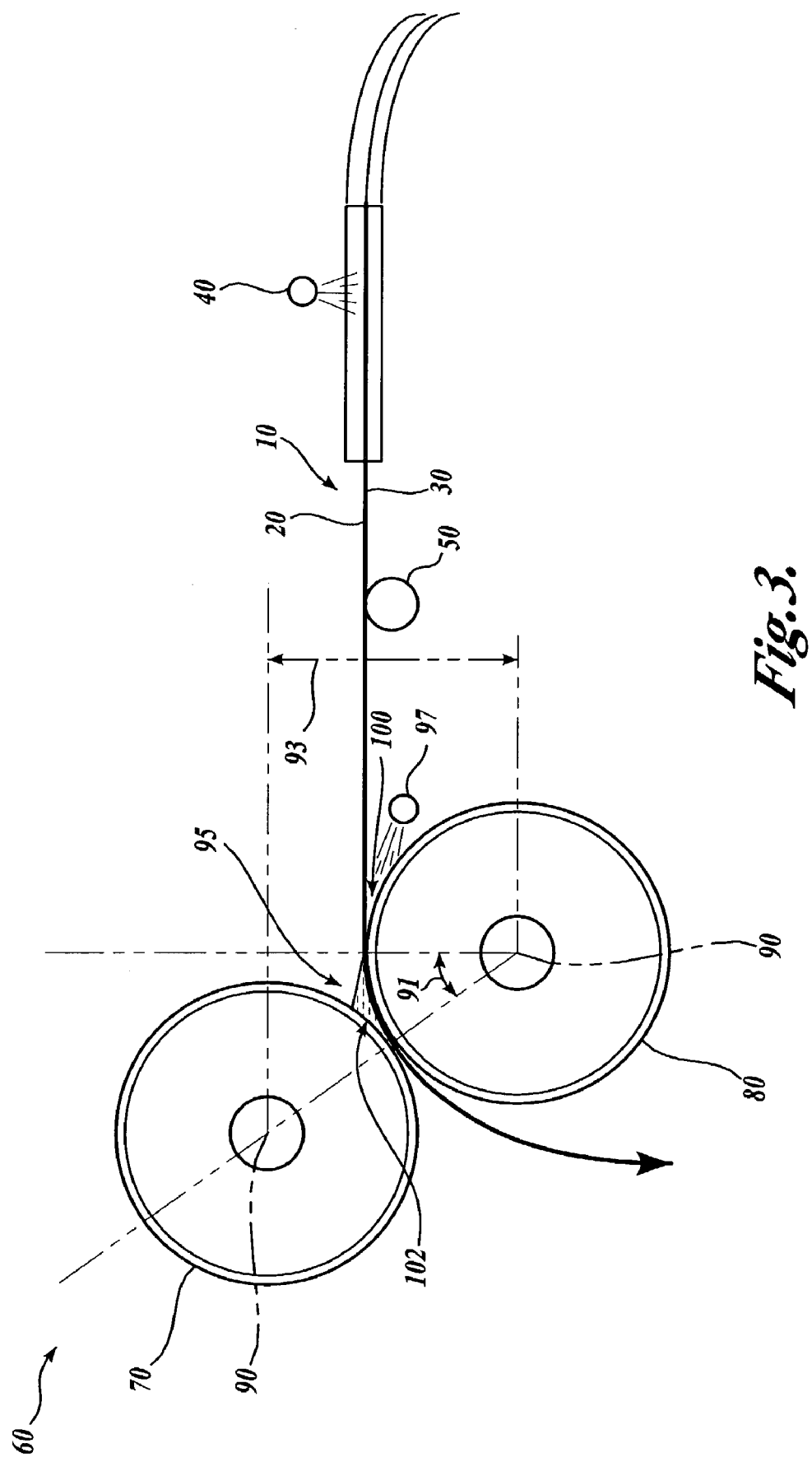
FIG. 3 is a schematic illustration of the general arrangement of a system of the present invention including a horizontal offset press and fluid dispensers.

Referring to FIG. 3, a sheet of cellulose fibers 10 to which crosslinking agent is applied in accordance with the present invention includes a first side 20 and an opposing side 30. In the illustrated embodiment, first side 20 is the upper side and second side 30 is the under side. Sheet 10 can be provided from a conventional roll of cellulose fibers. Sheet 10 of cellulose fibers passes a fluid dispenser 40 located upstream about 0.1 to 2.0 meters, from the nip 102 formed between the press and first side 20. The distance that fluid dispenser 40 is positioned form the nip between the press and first side 20 is selected taking into consideration, the type of fluff pulp sheet, the speed of the sheet of cellulose fibers 10, the amount of crosslinking agent to be applied to the sheet, the amount of crosslinking agent that the fluid dispenser can apply to the sheet, and the crosslinking agent retention time prior to pressing. For example, as the speed of the sheet increases, or the amount of crosslinking agent to be applied to the sheet increases, the distance between the fluid dispenser and the nip will increase. As the amount of crosslinking agent to be applied to the sheet increases, the distance between the nip and the fluid dispenser will vary depending on the type of crosslinking agent, the solution strength, the sheet speed, and the acquisition rate of the fluff pulp sheet. Optimization of these variables depend on factors such as type of fluff pulp sheet, crosslinking agent acquisition rate of pulp sheet, amount of crosslinking agent on the fiber desired, and the amount of FAQ wet bulk desired. The optimum amount of crosslinking agent applied to the fiber is determined by the fiber singulation and the FAQ wet bulk desired. This can be impacted by the type of crosslinking agent solution, the crosslinking agent solution strength, the amount of crosslinking agent applied by the distribution headers, the press loading and the overall singulation of the fibers. Optimization of these variables may result in an offset press pond just upstream of the press to assure complete crosslinking agent penetration throughout the fluff pulp sheet. The crosslinking agent is applied at a rate that is relative to the sheet speed, keeping the same amount of agent on the sheet at varying sheet speed.

The location of fluid dispenser 40 should be chosen so that time is provided for the crosslinking agent applied by fluid dispenser 40 to absorb into sheet 10 and expel air from the sheet before the second header applies crosslinking agent to the under side 30. Absorption of the crosslinking agent into sheet 10 is evidenced by a wet then dry line across the sheet before the sheet reaches a pond formed in the nip between roll 70 and first side 20. The pond is a volume of crosslinking agent that is squeezed from the sheet as it enters the press. The pond size and length is impacted by the amount of crosslinking chemistry applied to the sheet, the sheet speed, and the distance the headers are from the press nip.

Fluid dispenser 40 dispenses the crosslinking agent onto the first side 20 of sheet 10 of cellulose fibers. The design of the dispenser 40 is such that it applies the crosslinking agent uniformly across the width of the first side 20 of sheet 10. The selection of the size of the curtain slot, nozzles or orifices in the fluid dispenser along with their spacing is chosen to achieve such uniform distribution. In addition, the fluid dispenser is designed to provide the desired amount of crosslinking agent to the moving sheet 10. One type of useful fluid dispenser is a curtain header, the details of which are described below more thoroughly. Downstream from fluid dispenser 40 positioned in contact with the underside of sheet 10 is a guide roll 50 which serves to support and spread the moving sheet 10. Sheet 10 with its first side 20 treated with crosslinking chemicals is delivered to a press 60.

In the embodiment illustrated in FIG. 3, press 60 is a horizontal offset press that includes a first roll 70 and a second roll 80. Each roll 70 and 80 includes an axis of rotation 90. The rolls are of a conventional design and may include nitrile rubber covers. The axis of rotation 90 of roll 70 is offset both horizontally and vertically from the axis of rotation 90 of roll 80. An angle 91 is defined by a vertical line drawn through the axis of rotation of one roll and a line connecting the axis of rotation of the two rolls. Angle 91 may range from about 5 to about 30 degrees. The axes of rotation 90 of roll 70 and 80 are spaced apart in the vertical direction a distance 93. The distance 93 is less than the sum of the radiuses of roll 70 and roll 80 including the white nitrile rubber covers. Likewise, the distance that the axes of rotation are displaced horizontally from each other is less than the sum of the radiuses of the rolls. The size of angle 91 and the magnitude of vertical and horizontal offset between the rolls can vary and are selected so that a small reservoir 95 just upstream of the contact point between the outer circumferences of roll 70 and roll 80 is provided. By reservoir, it is meant that a location is provided at the contact point between the outer circumferences of roll 70 and roll 80 where fluid may accumulate.

Second side 30 of sheet 10 contacts the circumference of roll 80 at nip 100. First side 20 of sheet 10 contacts the outer circumference of roll 70 at nip 102 downstream from nip 100. In accordance with methods of the present invention, due to a combination of the load applied by press 60 and the amount of crosslinking agent applied by fluid dispenser 40, a pond of crosslinking agent forms in reservoir 95. Without being bound by theory, it is believed that the presence of this pond of crosslinking agent in reservoir 95 evidences the high loading level of crosslinking agent and uniform distribution of crosslinking agent within sheet 10, that is achievable with the methods and systems of the present invention. When a pond is absent from reservoir 95, the desirable high loading level of crosslinking agent and uniform distribution of the agent within a sheet of cellulose fibers may not be achieved in accordance with the methods and systems of the present invention. As sheet 10 leaves horizontal press 60, it is delivered to further unit operations for further processing.

Figure 4:
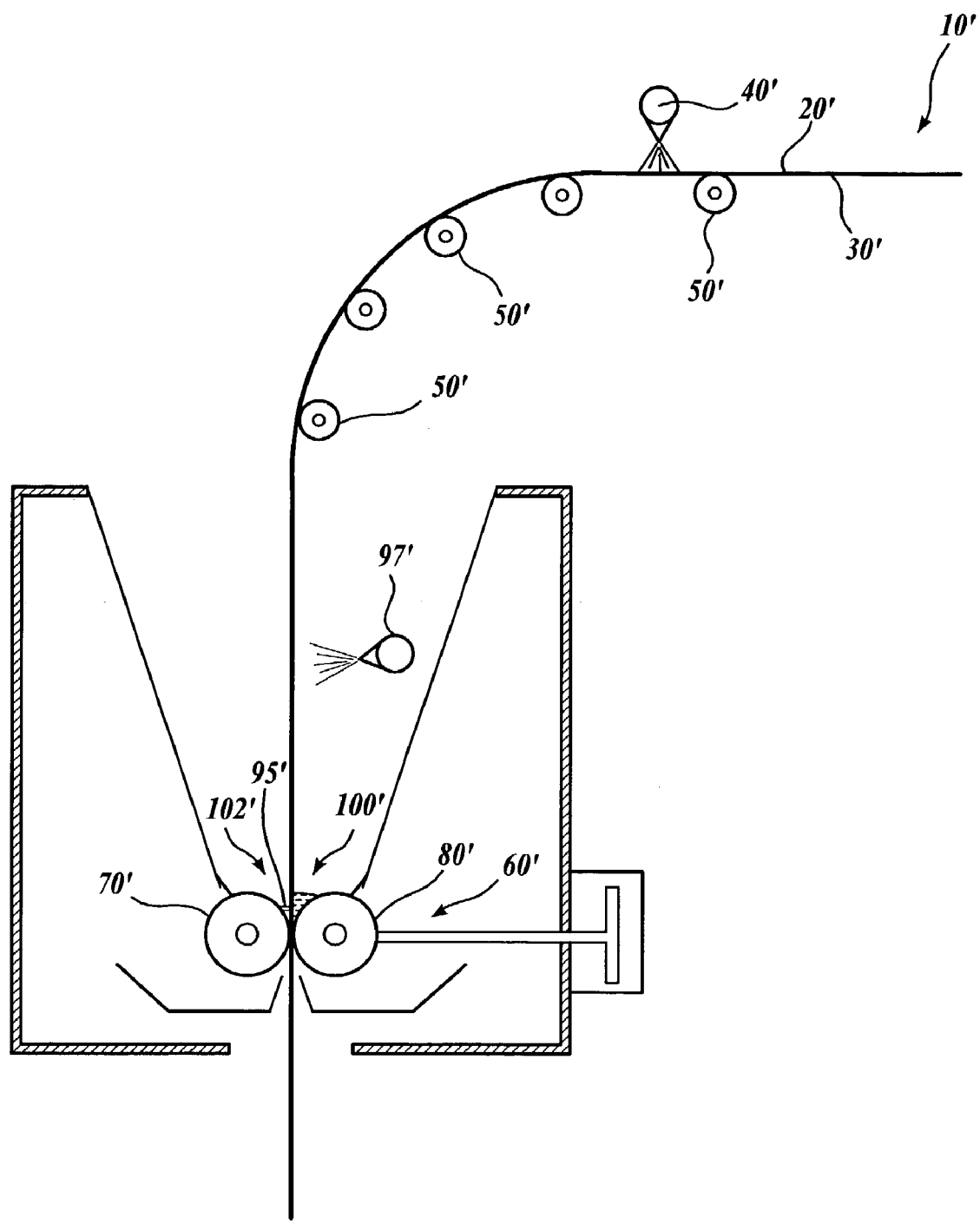
FIG. 4 is a schematic illustration of the general arrangement of a system of the present invention including a vertical press and fluid dispensers.

Referring to FIG. 4, in an alternative embodiment, a vertical press 60' can be substituted for the horizontal press with offset rolls described above. In FIG. 4, features that are common with FIG. 3 are denoted with the prime symbol ('). With the vertical press 60', a sheet of cellulose fibers 10' to which crosslinking is applied in accordance with the present invention includes a first side 20' and an opposing second side 30'. In the illustrated embodiment, first side 20' is the upper side and second side 30' is the underside. Sheet 10' can be provided from a conventional roll of cellulose fibers. Sheet 10' of cellulose fibers passes a fluid dispenser 40' located upstream from the nip of press 60' about 0.1 to 2.0 meters. The specific distance can be chosen taking into consideration the factors described above with respect to the horizontal press with offset rolls.

Fluid dispenser 40' dispenses the crosslinking onto the first side 20' of sheet 10' of cellulose fibers. Sheet 10' of cellulose fibers is then carried by guide rolls 50' and delivered to vertical press 60' that includes rolls 70' and 80'. The design of dispenser 40' is such that it applies to crosslinking across the width of the first side 20' of sheet 10'. The selection of the size of the nozzles or the orifices in the fluid dispenser along with their spacing is chosen to achieve uniform distribution of crosslinking agent across sheet 10'. In addition, the fluid dispenser is designed to provide the desired amount of crosslinking agent onto sheet 10'. One type of useful fluid dispenser is a curtain header, the details of which are described below more thoroughly.

For both the horizontal press embodiment and the vertical press embodiment, second side 30, 30' of sheet 10, 10' is contacted with crosslinking agent supplied by a second fluid dispenser 97, 97' positioned downstream from fluid dispenser 40, 40' and upstream of press 60, 60'. Fluid dispenser 97 directs crosslinking agent either on the sheet 10 or into the nip 100 where the second side 30, of sheet 10 contacts the surface of roll 80. Directing crosslinking agent onto sheet 10 or into nip 100 is described above is to be distinguished from application of crosslinking agents onto the surface of roll 80. Fluid dispenser 97' directs crosslinking agent onto second side 30' of sheet 10' at a location downstream from the first fluid dispenser 40' and upstream from the nip 100' forms between second side 30' and roll 80'.

Referring to both the horizontal press and vertical press embodiments, when crosslinking agent is applied to sheet 10, 10' as described above, a puddle of crosslinking fluid forms in the nip 100, 100' formed by roll 80, 80' and side 30, 30'. A puddle is a volume of crosslinking agent that forms at the nip 100, 100' as a result of the pressure applied to sheet 10, 10' at the nip and the amount of crosslinking agent being applied to the fluff pulp sheet.

Without being bound by theory, for the embodiment employing a horizontal press with offset rolls, the offset both horizontally and vertically between rolls 70 and 80 are chosen so that the portion of sheet 10 covered by the pond formed at nip 102 between roll 70 and upper side 20 of sheet 10 is not coextensive with the portion of sheet 10 contacted by the puddle of crosslinking agent formed in the nip 100 between roll 80 and side 30. In other words, referring to FIG. 3, the pond formed in reservoir 95 does not cover the entire portion of upper side 20 of sheet 10 that is located directly opposite the portion of side 30 in contact with the puddle in nip 100. With this configuration, gas contained within the sheet is purged with the agent application or is able to escape out a side of the sheet opposite the respective pond or puddle, rather than being trapped in the sheet. When the pond and puddle cover the same portion of sheet 10 on opposing sides, gas can be trapped in sheet 10. It is believed that by allowing gas present in the sheet to escape, the likelihood of total impregnation of the sheet is enhanced and delamination of the sheet as it exits the press is reduced.

In the embodiment employing a vertical press described with respect to FIG. 4, when a pond is present on the first side 20' and a puddle on the other side 30' of sheet 10' at the respective nips 102' and 100', the top of the pond at nip 102' should be offset from the top of the puddle in the nip 100'. In other words, the depth of the pond and the puddle are not equal. By controlling the height of the puddle and pond, trapping gas within sheet 10' is avoided as described above.

In order to provide satisfactory loading on sheet 10, 10' after crosslinking agent has been applied thereto, the press is capable of applying a load of up to four hundred pounds per square inch.

Figure 1:
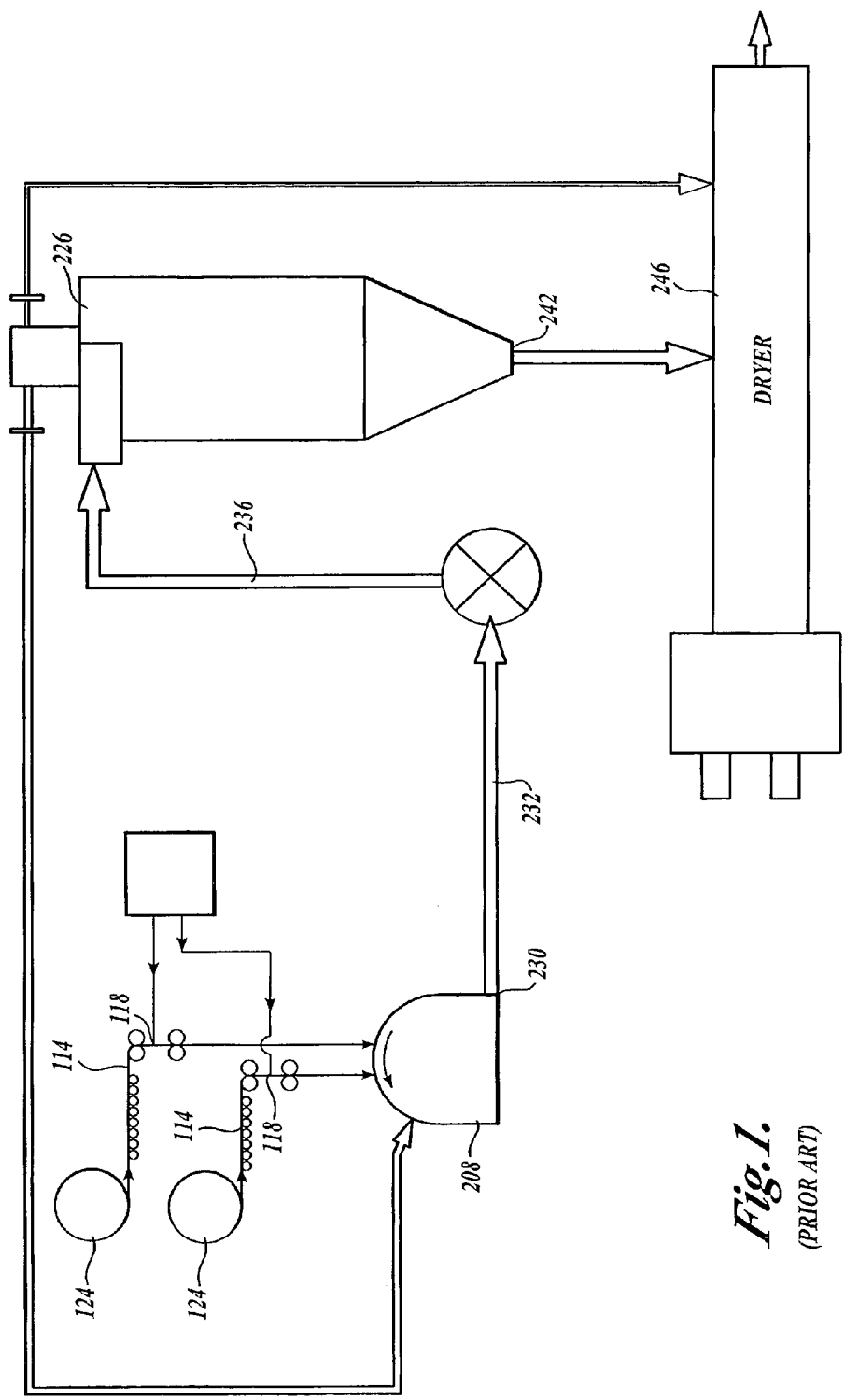
FIG. 1 is a schematic depiction of the general arrangement of a process for manufacturing high bulk fibers in which the methods and systems of the present invention are useful.
Figure 2:
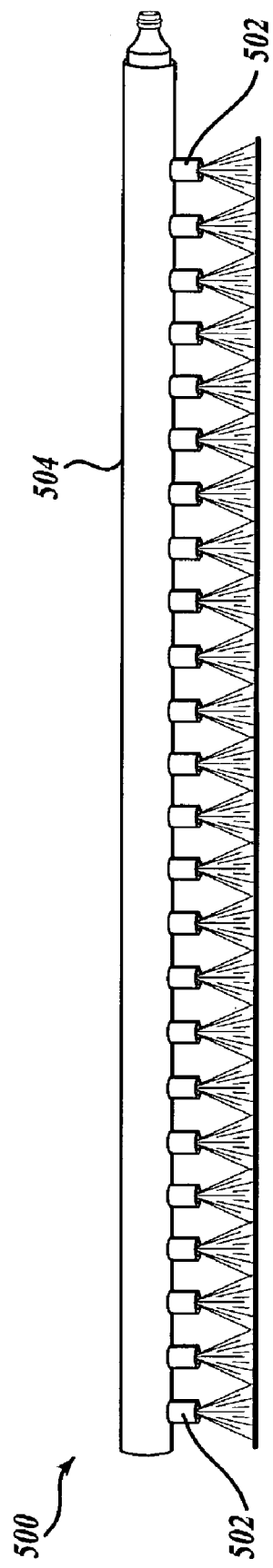
FIG. 2 is a perspective view of a fluid dispenser useful in methods and systems formed in accordance with the present invention.

Fluid dispensers 40, 40', and 97, 97' can take numerous forms such as rollers or sprayers and more applicators than these two described herein may be used. Referring to FIG. 2, a particular embodiment of a fluid dispenser is a curtain shower 500 designed to deliver the crosslinking agent through a number of nozzles 502 equally spaced along the length of a tubular header 504. The size and spacing of the spray nozzles is determined by the type of crosslinking agent, solution strength, and the amount of crosslinking agent that is to be applied per linear foot of the sheet of cellulose fibers. As discussed above, the size and spacing is chosen so that the curtain header applies the crosslinking agent across the sheet as it passes by the curtain header. Uniform application of the crosslinking agent to the surface of a sheet is evidenced by the absence of any dry lines or overly wet lines forming on the sheet immediately after application of the crosslinking agent. For sheet speeds ranging from about 7.62 to about 61 meters per minute, the curtain header should be capable of applying crosslinking agent in a manner as to achieve the complete sheet cover and penetration. As an alternative to nozzles, orifices may be formed in tubular header 504. Exemplary nozzles include VeeJet, FloodJet, WashJet, or UniJet nozzles by Spraying Systems Company, Wheaton, Ill. 60189

Preferably, about 60 to 85% of the crosslinking agent to be applied in total to the sheet of cellulose fibers is applied by the fluid dispenser to the top surface 20, 20' of the sheet and the remaining portion is applied using the second fluid dispenser 97, 97'. The amount of crosslinking agent to be applied by the respective dispensers should take into consideration the size of the pond or puddle that forms in the respective nips. Additional headers may be used to achieve the crosslinking agent acquisition and/or to apply varying types of crosslinking agent to the pulp sheet.

The total amount of crosslinking agent that can be added to the sheet of cellulose fibers is determined in part based on the desired consistency of the sheet after the crosslinking agent has been applied. Exemplary consistencies range from about 50% to about 80% with the preferred consistency being about 68% to achieve optimum application rate, singulation of fibers and FAQ wet bulk. The systems and method of the present invention allow loading of crosslinking agent on pulp in the range of about 1% to about 30% crosslinking agent based on dry pulp weight, but preferably about 10%. In order to provide desirably high bulk and fluid acquisition quality properties, the amount of crosslinking agent applied to the sheet of cellulose fibers ranges from about 5% to 40% weight. The range of FAQ wet bulk achieved by the present invention range from about 8 to about 30 cc/g but preferably about 16–22 cc/g.

The following example illustrates results achieved using methods and systems of the present invention, but it should be understood that the present invention is not limited by the example.

EXAMPLE

The following example illustrates how methods and systems of the present invention apply crosslinking agents to pulp sheets and achieve a high loading and an even distribution of the crosslinking agent throughout the length, width and depth of the sheets of cellulose fibers. In this example, crosslinking agent was applied to the top side of the sheet of wood pulp fibers (NHB 416) using a curtain header located 1.3 meters upstream from an offset press. The curtain header extended across the width of the sheet and included about 0.13 cm diameter nozzles spaced apart about 7 centimeters evenly along the length of the header. A similar header was used to apply crosslinking agent to the underside of the sheet of wood pulp fibers at the nip point between the underside of the sheet and the bottom roll. The horizontal offset press was used in this example and included rolls 35.56 centimeters in diameter carrying a white nitrile rubber cover. The axes of rotation of the rolls were offset radially by about 15 degrees. The vertical distance between the axes of rotation of the two rolls was about 34.3 centimeters. The press applied a loading of about 225 pli. The speed of the sheet was 30.5 meters per minute. The crosslinking agent solution had a concentration of 18.5 weight % of dry crosslinking agents. The untreated softwood fluff pulp sheet was 750 $g/m^3$ and 134 cm in width. The crosslinking agent was applied to the sheet at a rate of 0.15 liter per linear foot. The collected sheet exiting the press showed no signs of delamination. Consistency samples were taken from the end of the roll across the sheet. The samples were tested to determine the weight % solids in the sheet wherein the solids comprised dry pulp and dry crosslinking agent (consistency). The four samples exhibited a consistency of 60.95, 61.0, 60.73, and 60.59. Consistencies of the sheet from top to bottom were also assessed. The top half of the sheet exhibited a consistency of 59.75, and the bottom half exhibited a consistency of 59.5. The foregoing illustrates that a method and system of the present invention is able to produce sheets of cellulose fibers impregnated with crosslinking agent wherein the crosslinking agent is uniformly and evenly distributed within the sheet of cellulose fibers.

The embodiments of the invention in which an exclusive property or privilege is claimed are defined as follows:

1. A system for applying crosslinking agent to a moving sheet of cellulose fibers, the system comprising:
a first fluid dispenser positioned to apply crosslinking agent onto a first side of the sheet of cellulose fibers;
a second fluid dispenser for applying crosslinking agent to a second opposing side of the sheet of cellulose fibers, the second fluid dispenser positioned downstream in the direction of movement of the sheet of cellulose fibers from the first dispenser;

a press positioned downstream of the second fluid dispenser for receiving the sheet of cellulose fibers treated with crosslinking agent;

wherein the press further comprises a horizontal press having two rolls, each having an axis of rotation, the axis of rotation of one roll being offset horizontally and vertically from the axis of rotation of the other roll.

2. The system of claim 1, wherein the axes of rotation of the rolls are offset radially by about 5 to 30 degrees.

3. The system of claim 1, wherein the first fluid dispenser is spaced about 0.1 to about 2.0 meters upstream from a nip point between the first side of the sheet of cellulose fibers and a roll.

4. The system of claim 1, wherein the horizontal press is capable of applying a load to the sheet of cellulose fibers up to about 400 pounds per square inch.

5. The system of claim 1, wherein the second fluid dispenser is positioned to apply the crossliinking agent to the second side of the sheet of cellulose fibers at a nip point between the second side and a roll.

6. The system of claim 1, wherein the press comprises a vertical press.

* * * * *